United States Patent
Tomiyoshi (10) Patent No.: US 7,119,522 B1
(45) Date of Patent: Oct. 10, 2006

(54) APPARATUS AND METHOD FOR STEP-DOWN SWITCHING VOLTAGE REGULATION

(75) Inventor: Kenji Tomiyoshi, Mihama-ku (JP)

(73) Assignee: National Semiconductor Corporation, Santa Clara, CA (US)

( * ) Notice: Subject to any disclaimer, the term of this patent is extended or adjusted under 35 U.S.C. 154(b) by 8 days.

(21) Appl. No.: 11/002,544

(22) Filed: Dec. 1, 2004

Related U.S. Application Data (63) Continuation-in-part of application No. 10/835,616, filed on Apr. 29, 2004.

(51) Int. Cl.
  G05F 1/40 (2006.01)
  G05F 1/613 (2006.01)
(52) U.S. Cl. .................. 323/224; 323/283; 323/288
(58) Field of Classification Search ............ 323/224, 323/283, 288
  See application file for complete search history.

(56) References Cited

U.S. PATENT DOCUMENTS 6,396,252 B1   5/2002   Culpepper et al.
6,930,474 B1 *  8/2005   Wang .................. 323/288

OTHER PUBLICATIONS

U.S. Appl. No. 10/985,477, Kenji Tomiyoshi.
Linear Technology Data Sheet (1999) "LTC 1707-High Efficiency Monolithic Synchronous Step-Down Switching Regulator," pp. 1-16, Linear Technology Corporation, Milpitas, California.
Maxim Data Sheet (2001) "MAX1684/MAX1685-Low-Noise, 14V Input, 1A, PWM Step-Down Converters," pp. 1-14, Maxim Integrated Products, Sunnyvale, California.

* cited by examiner

*Primary Examiner*—Shawn Riley
(74) *Attorney, Agent, or Firm*—Darby & Darby PC; Matthew M. Gaffney (57) ABSTRACT

A current mode PWM buck regulator is provided. The regulator includes a top-side transistor, a bottom-side transistor, an inductor, a sample-and-hold circuit, a ramp generator, a PWM comparator, an error amplifier, and a current sense amplifier. A current through the low-side transistor is sensed by the current sense amplifier. Also, a current sense voltage provided by the current sense amplifier is sampled when the low-side transistor is on, and held when the low-side transistor is off. The ramp generator is arranged to generate a voltage ramp that emulates the upslope of the inductor current. Additionally, the sampled low-side transistor current is combined with the voltage ramp. The PWM comparator is arranged to provide a PWM signal by comparing the voltage ramp to a comparison signal provided by the error amplifier.

11 Claims, 6 Drawing Sheets

APPARATUS AND METHOD FOR STEP-DOWN SWITCHING VOLTAGE REGULATION

RELATED APPLICATION

This application is a continuation-in-part of the application having the application Ser. No. 10/835,616, filed on Apr. 29, 2004, of which the benefit of the earlier filing date is hereby claimed under 35 U.S.C. § 120, and which is hereby incorporated by reference.

FIELD OF THE INVENTION

The invention is related to voltage regulation, and in particular, to an apparatus and method for a step-down switch voltage regulator circuit that samples a sensed current of the low-side switch.

BACKGROUND OF THE INVENTION

A step-down switching regulator may be configured to provide a regulated output voltage (Vout) in response to an input voltage (Vin). The switching regulator may include a top-side transistor and a bottom-side transistor. When the top-side transistor is on and the bottom-side transistor is off, Vin−Vout is applied across an inductor, causing the inductor current to ramp upwards. When the top-side transistor is off and the bottom-side transistor is on, the inductor current ramps downwards. The inductor current is applied to a capacitor to provide the output voltage. Also, feedback may be employed to control the duty cycle of the switching. The output voltage may be sensed to provide the feedback. In current mode switching regulators, current sensing is also employed. Previously, current sensing has been accomplished by coupling a resistor in series with the inductor, and sensing a voltage drop across the resistor.

BRIEF DESCRIPTION OF THE DRAWINGS

Non-limiting and non-exhaustive embodiments of the present invention are described with reference to the following drawings, in which.

DETAILED DESCRIPTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Briefly stated, the invention is related to a current mode PWM buck regulator. The regulator includes a top-side transistor, a bottom-side transistor, an inductor, a sample-and-hold circuit, a ramp generator, a PWM comparator, an error amplifier, and a current sense amplifier. A current through the low-side transistor is sensed by the current sense amplifier. Also, a current sense voltage provided by the current sense amplifier is sampled when the low-side transistor is on, and held when the low-side transistor is off.

The ramp generator is arranged to generate a voltage ramp that emulates the upslope of the inductor current. Additionally, the sampled low-side transistor current is combined with the voltage ramp. The PWM comparator is arranged to provide a PWM signal by comparing the voltage ramp to a comparison signal provided by the error amplifier.

Figure 1:
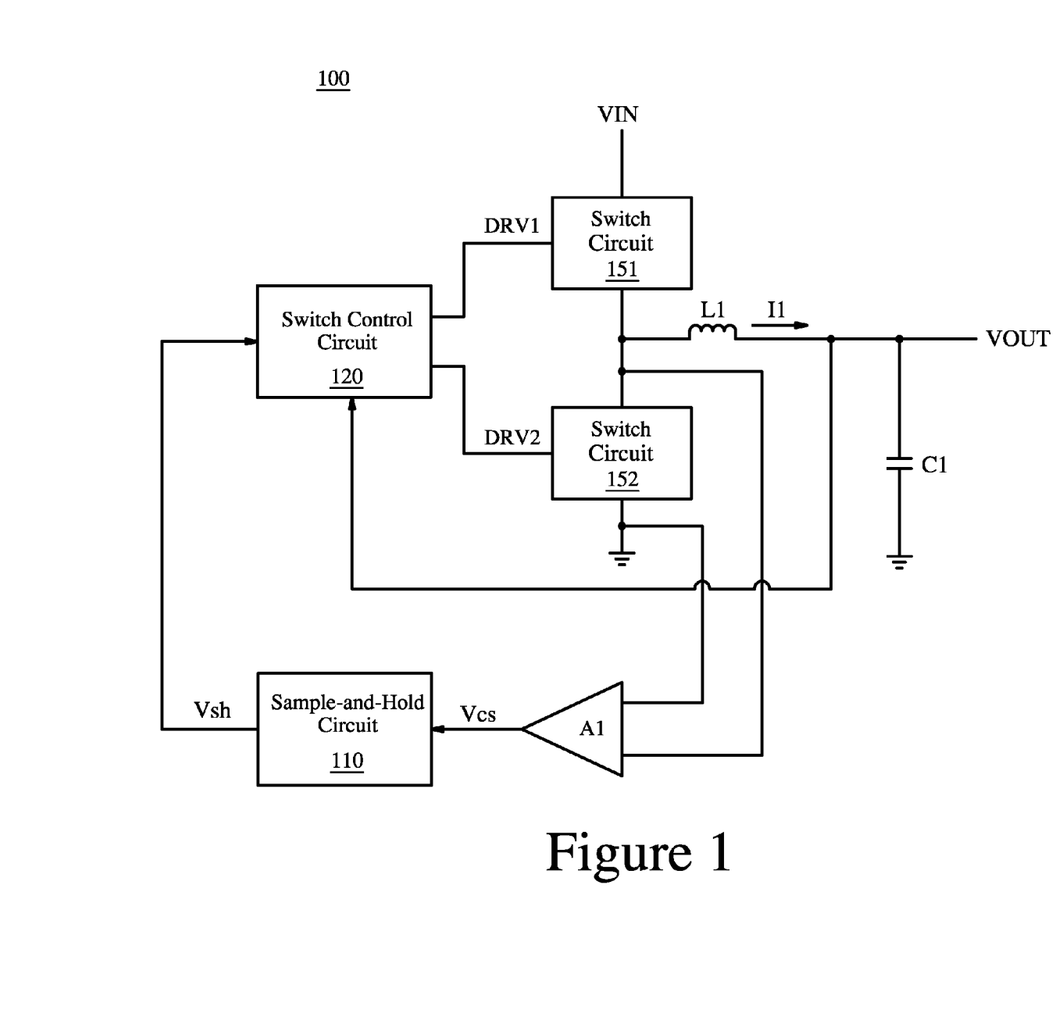
FIG. 1 illustrates a block diagram of an embodiment of a regulator circuit.

FIG. 1 illustrates a block diagram of an embodiment of regulator circuit 100. Regulator circuit 100 includes top-side switch circuit 151, bottom-side switch circuit 152, inductor circuit L1, capacitor circuit C1, current-sense amplifier circuit A1, sample-and-hold circuit 110, and switch control circuit 120.

Inductor circuit L1 is arranged to provide current I1. More specifically, inductor circuit L1 is arranged such that a voltage substantially given by Vin−Vout is across inductor L1 when switch circuit 151 is closed. Accordingly, dI1/dt is substantially given by (Vin−Vout)/L1 when switch circuit 151 is closed.

Also, capacitor circuit C1 is configured to provide output voltage Vout from current I1. Current-sense amplifier A1 is configured to sense a current across switch circuit 152 and provide current sense voltage Vcs in response to the sensed current. Additionally, sample-and-hold circuit 110 is configured to sample voltage Vcs when switch circuit 152 is closed, and further configured to hold voltage Vcs when switch circuit 152 is open. Switch control circuit 120 is configured to provide signals DRV1 and DRV2 based in part on signals Vout and Vsh. Further, switch control circuit 120 is configured to provide signal DRV2 as an inverse of signal DRV1. Switch circuit 151 is configured to open and close responsive to signal DRV1, and switch circuit 152 is configured to open and close responsive to signal DRV2.

Figure 2:
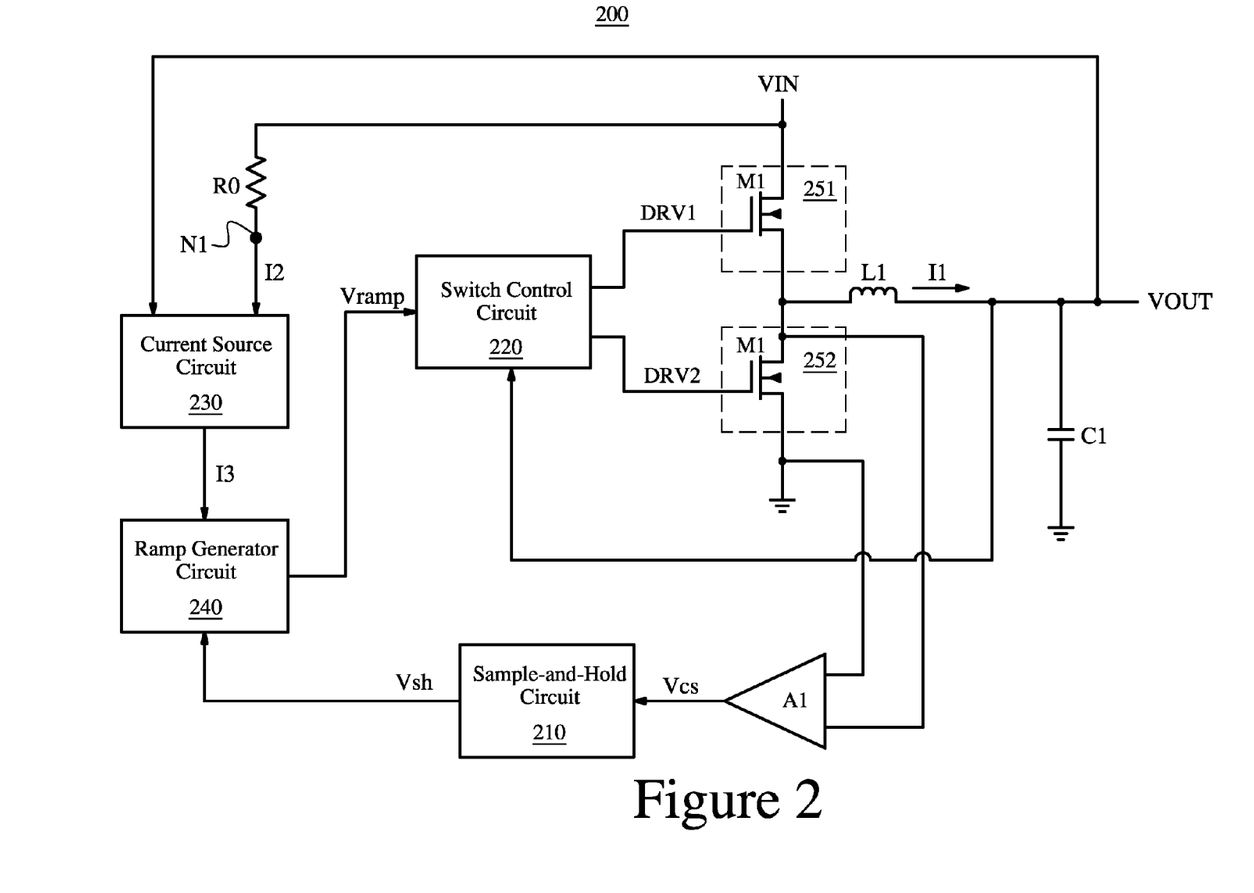
FIG. 2 shows a block diagram of an embodiment of the regulator circuit of FIG. 1 that includes a current source circuit for emulating the inductor current.

FIG. 2 shows a block diagram of an embodiment of regulator circuit 200 that includes a current source circuit for emulating the inductor current. Components in regulator circuit 200 may operate in a substantially similar manner to similarly named components in regulator circuit 100, and may operate in a different manner in some ways. Regulator circuit 200 further includes current source circuit 230 and resistor R0. In regulator circuit 200, top-side switch circuit 251 includes transistor M1, and bottom-side switch circuit 252 includes transistor M2.

In operation, current source circuit 230 is configured to provide a voltage that is substantially equal output voltage Vout at node N1. Accordingly, resistor R0 has a voltage substantially equal to Vin−Vout across it. Resistor R0 is arranged to provide current 12, where current 12 is substantially given by (Vin−Vout)/R0. Also, current source circuit 230 is further configured to provide current 13 from current 12.

Additionally, ramp generator circuit 240 provides voltage Vramp from current 13 and voltage Vsh. By proper preselection of a resistance that is associated with resistor R0, the upslope associated with voltage Vramp is substantially similar to the upslope associated with current I1. Also, the voltage ramp is offset according to voltage Vsh. Accordingly, voltage Vramp substantially emulates current I1. Switch control circuit 220 is arranged to provide signals DRV1 and DRV2, based in part on signals Vramp and Vout.

Figure 3:
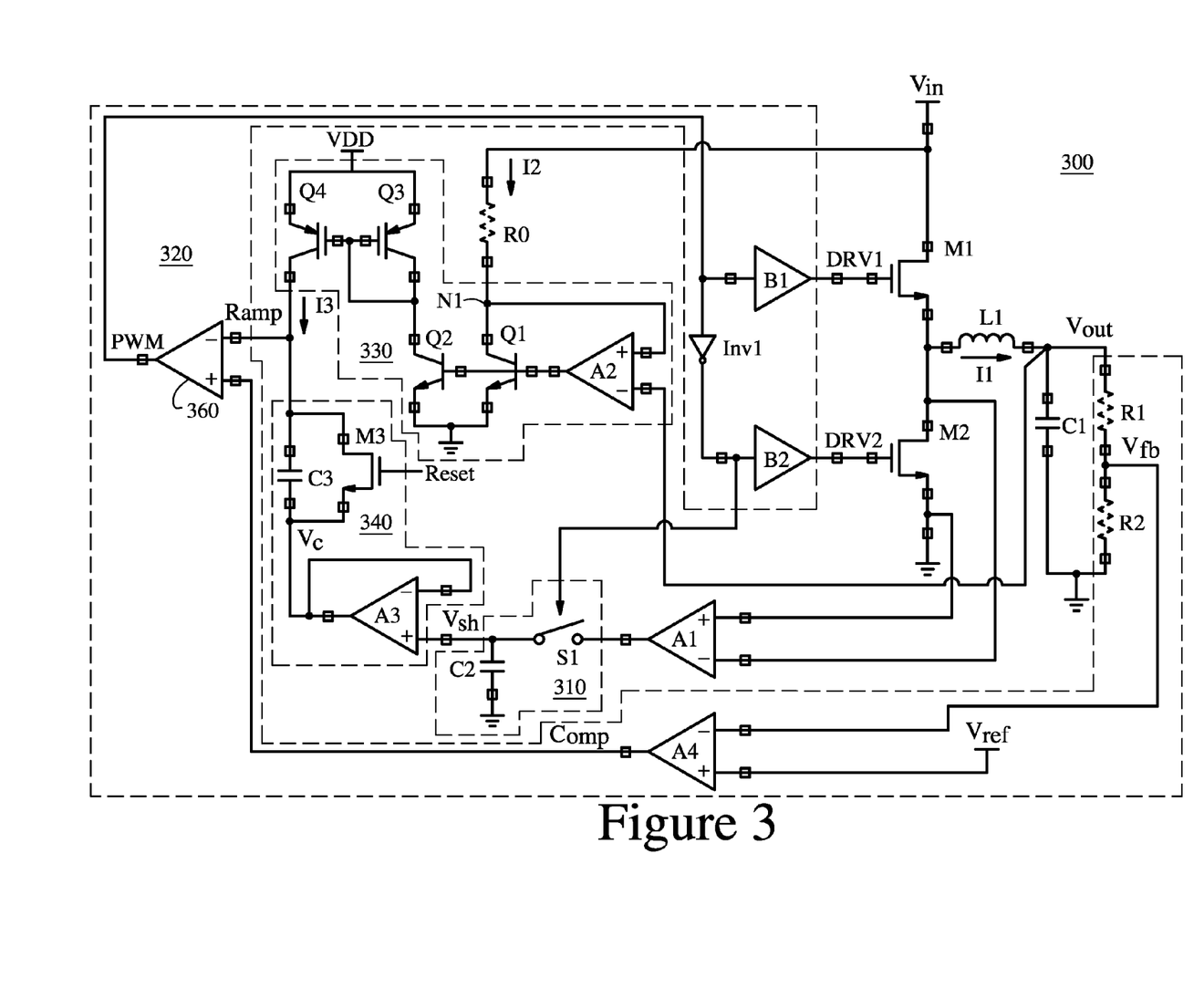
FIG. 3 schematically illustrates an embodiment of the regulator circuit of FIG. 2.

FIG. 3 schematically illustrates an embodiment of regulator circuit 300. Components in regulator circuit 300 may operate in a substantially similar manner to similarly named components in regulator circuit 300, and may operate in a different manner in some ways. Current source circuit 330 may include transistors Q1–Q4 and operational amplifier circuit A2. Sample-and-hold circuit 310 includes switch circuit S1 and capacitor circuit C2. Also, ramp generator circuit 340 may include capacitor circuit C3, transistor M3, and operational amplifier circuit A3. Switch control circuit 320 may include resistors R1 and R2, error amplifier A4, PWM comparator circuit 360, Inverter Inv1, and buffers B1 and B2.

In operation, operational amplifier circuit A2 may adjust the base voltage of transistors Q1 and Q2 such that the voltage at node N1 is substantially equal to output voltage Vout. Transistors Q1 and Q2 may be arranged as a current source to mirror current I2 to the collector of transistor Q3. Similarly, transistors Q3 and Q4 may be arranged as another current source that is configured to mirror the collector current of transistor Q3 to provide current I3.

Also, transistor M3 is arranged as a switch that is responsive to signal Reset. Amplifier circuit A3 may be arranged as a follower, such that sensed signal Vc is substantially equal to voltage Vsh. When signal Reset is low, signal Ramp begin linearly increasing from signal Vc. In this way, signal Vc is combined with signal Ramp. Signal Ramp continues to linearly increase until signal Reset changes to high. When signal Reset changes to high, capacitor C3 discharges, and signal Ramp returns to voltage Vc.

Further, the upslope associated with signal Ramp is substantially given by $dV/dt=(Vin-Vout)/(R0*C3)$. Accordingly, by properly pre-selecting the resistance of resistor R0, the upslope of the voltage ramp is substantially similar to the upslope of inductor current I1.

Additionally, in one embodiment, if Vin is substantially greater than Vout, the value of Vout can be ignored, e.g., where Vin is relatively equivalent to 10 volts and Vout is relatively equivalent to 1 volt. In this embodiment, the upslope associated with signal Ramp can be represented by $dV/dt=Vin/(R0*C3)$.

Also, resistors R1 and R2 may be arranged as a voltage divider that is configured to provide voltage Vfb from voltage Vout. Error amplifier A4 may be configured to provide signal Comp from signals Vfb and Vref. PWM comparator circuit 360 is configured to provide signal PWM from in response to a comparison of signals Comp and Ramp. Buffer B1 may be configured to provide signal DRV1 from signal PWM. Also, inverter circuit Inv1 may be arranged to invert signal DRV1. Buffer B2 may be arranged to buffer the output signal of inverter circuit Inv1 to provide signal DRV2.

Although a particular arrangement regulator circuit 300 is illustrated in FIG. 3, other embodiments may include other arrangements of circuit 300. For example, buffers B1 and B2 and operational amplifier A3 are optional circuit components that need not be included in regulator circuit 300. Additionally, current source circuit 330 may be arranged in a different manner than shown in FIG. 3. Also, although operational amplifier A2 is employed to provide a voltage that is substantially equal to Vout at node N1, operational amplifier A2 may be replaced with a different circuit that is arranged to provide a voltage that is substantially equal to Vout at node N1. Although FIG. 3 illustrates an embodiment in Inverter Inv1 is employed to provide signal DRV2 as an inverse of signal DRV1, in other embodiments, other arrangements may be employed to provide signal DRV2 as an inverse of signal DRV1.

Figure 4:
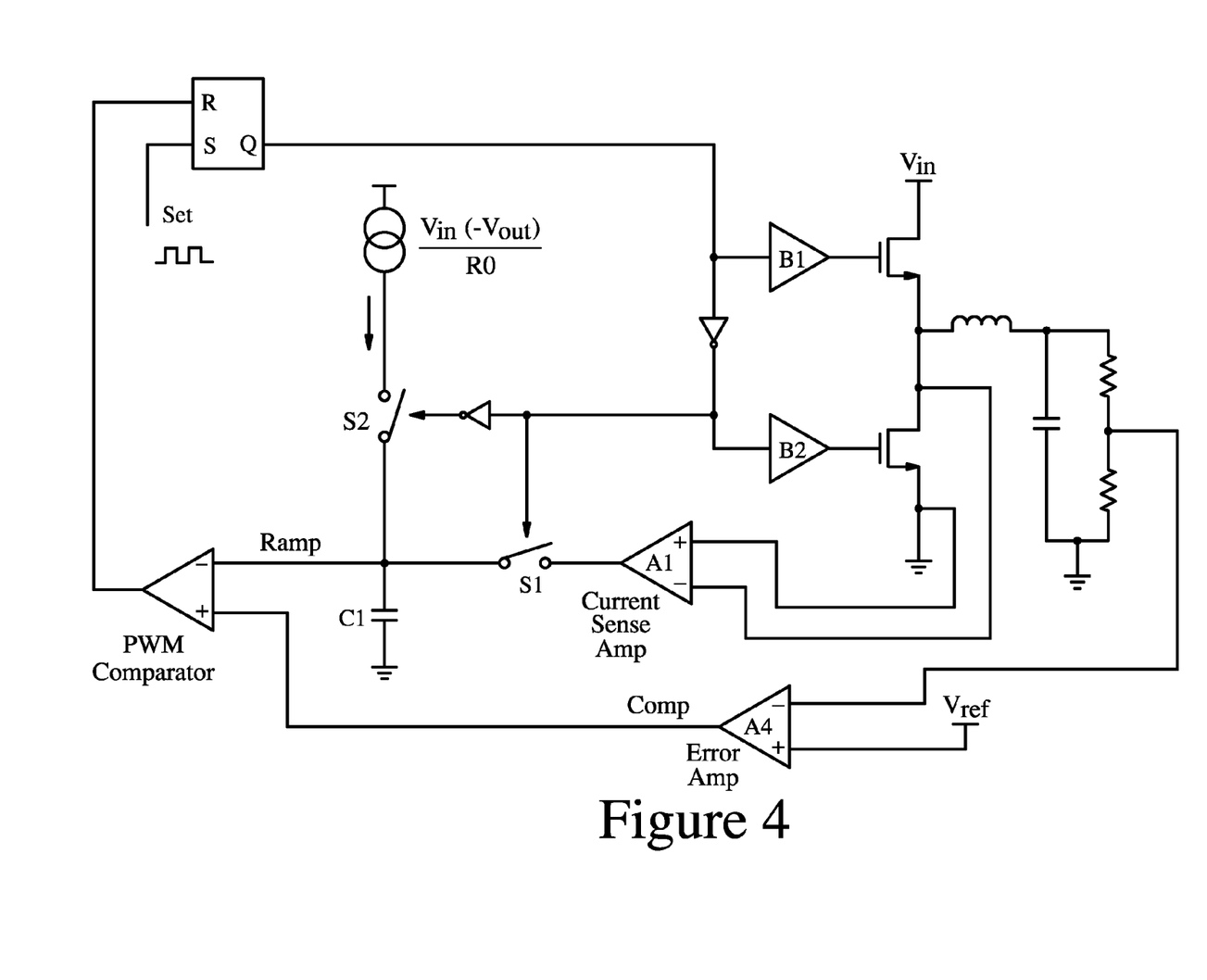
FIG. 4 schematically illustrates another embodiment of the regulator circuit.

FIG. 4 illustrates another embodiment of the invention where the operation of a ramp generator capacitive element and a sample and hold capacitive element are combined in one capacitive element C1. In this embodiment, if S1 is closed, the combined capacitor operates as the sample and hold capacitor discussed above. Similarly, if S2 is closed, the combined capacitor operates as the ramp generator capacitor discussed above. Further, when the low side switch is on, S1 is on and S2 is off.

Figure 5:
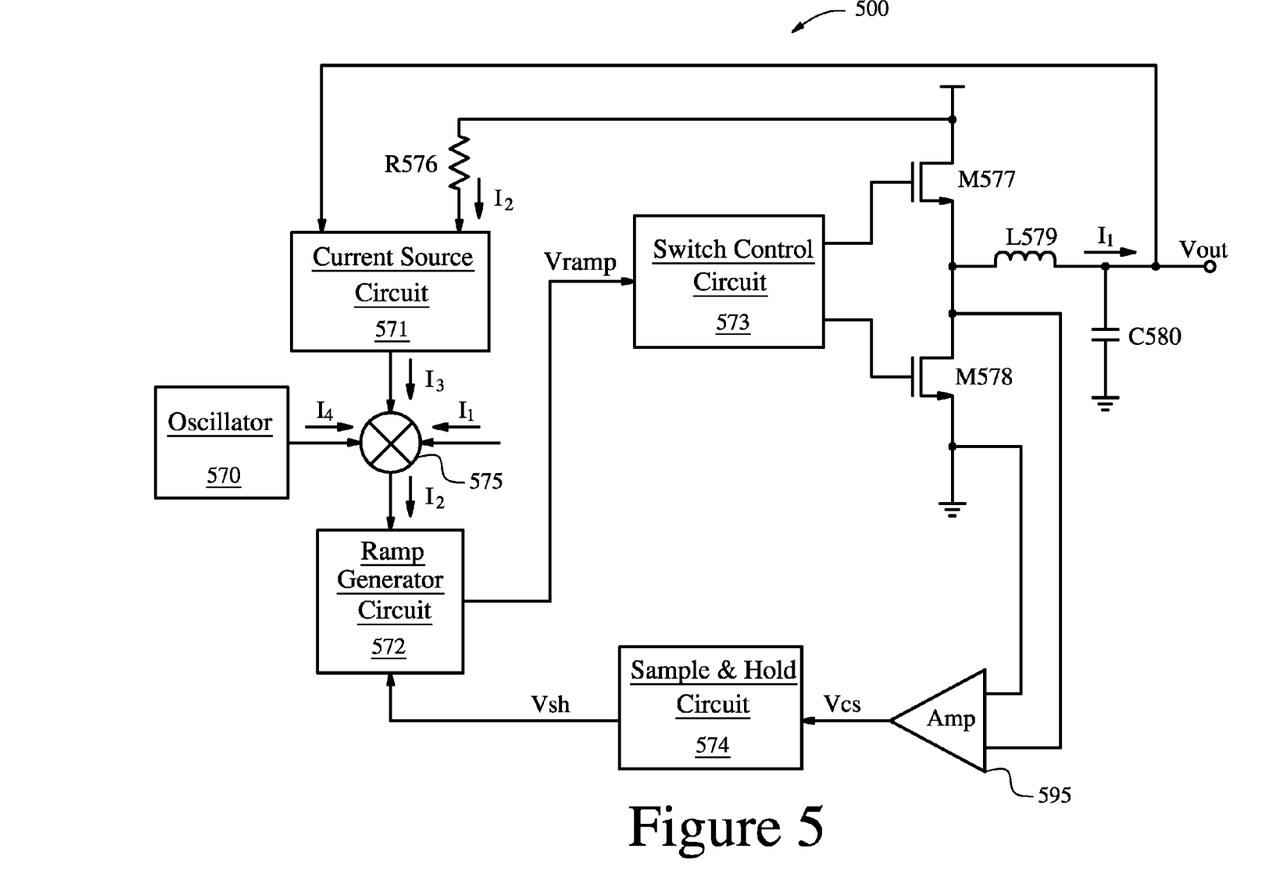
FIG. 5 illustrates another embodiment of a regulator circuit arranged in accordance with aspects of the present invention.

FIG. 5 illustrates an embodiment of regulator circuit 500 arranged in accordance with aspects of the present invention. Regulator circuit 500 includes top-side switch circuit M577, bottom-side switch circuit M578, inductor circuit L579, capacitor circuit C580, resistor circuit R576, current-sense amplifier circuit 595, sample-and-hold circuit 574, oscillator 570, current source circuit 571, ramp generator circuit 572, current multiplier 575, and switch control circuit 573.

Inductor circuit L579 is arranged to provide current I1. More specifically, inductor circuit L579 is arranged such that a voltage substantially given by Vin–Vout is across inductor L579 when switch circuit M577 is closed. Accordingly, dI1/dt is substantially given by (Vin–Vout)/L579 when switch circuit M577 is closed.

Also, capacitor circuit C580 is configured to provide output voltage Vout based on current I1. Current-sense amplifier 595 is configured to sense a current across switch circuit M578 and provide current sense voltage Vcs in response to the sensed current. Additionally, sample-and-hold circuit 574 is configured to sample voltage Vcs when switch circuit M578 is closed, and further configured to hold voltage Vcs when switch circuit M578 is open. Switch control circuit 573 is configured to provide a first signal and a second signal to switch circuits M577 and M578 based in part on Vramp. Further, switch control circuit 573 is configured to provide the second signal as an inverse of the first signal. Switch circuit M577 is configured to open and close responsive to the first signal, and switch circuit M578 is configured to open and close responsive to the second signal.

Switch control circuit 573 is arranged to be controlled by Vramp generated by ramp generator circuit 572. Ramp generator circuit 572 is arranged to receive current I5 from current multiplier 575 and voltage Vsh from sample and hold circuit 573. Current multiplier 575 is arranged to determine I5 based on currents I4 from oscillator 570 and I3 from current source circuit 571 such that $I5=(I3*I4)/I1$, where I1 is reference current and 12 uA in this case. Current source circuit 571 is arranged to receive Vout and I2, where $I2=(Vin-Vout)/R2$. Current source circuit 571 is further arranged to provide I3 such that $I3=(Vin-Vout)/R$, where the R is 2 Mohm. Moreover, I4 is determined by oscillator 570 such that $I4=fosc*K$, where K is $6*10^{-12}$, and fosc is a frequency of the oscillator. I1, R, and K may be different value depending upon current mirror ratio in analog multiplier circuit 575 and current source circuit 571, or a capacitor value in the ramp generator circuit 572.

By employing current source circuit 571 and oscillator 570 to determine I5, which is used to determine Vramp, a frequency and a magnitude of Vramp may be modified without using an external resistor. In one embodiment, oscillator 570 may comprise a current controlled oscillator enabling a user to modify Vramp by changing a value of a current provided to oscillator 570.

Figure 6:
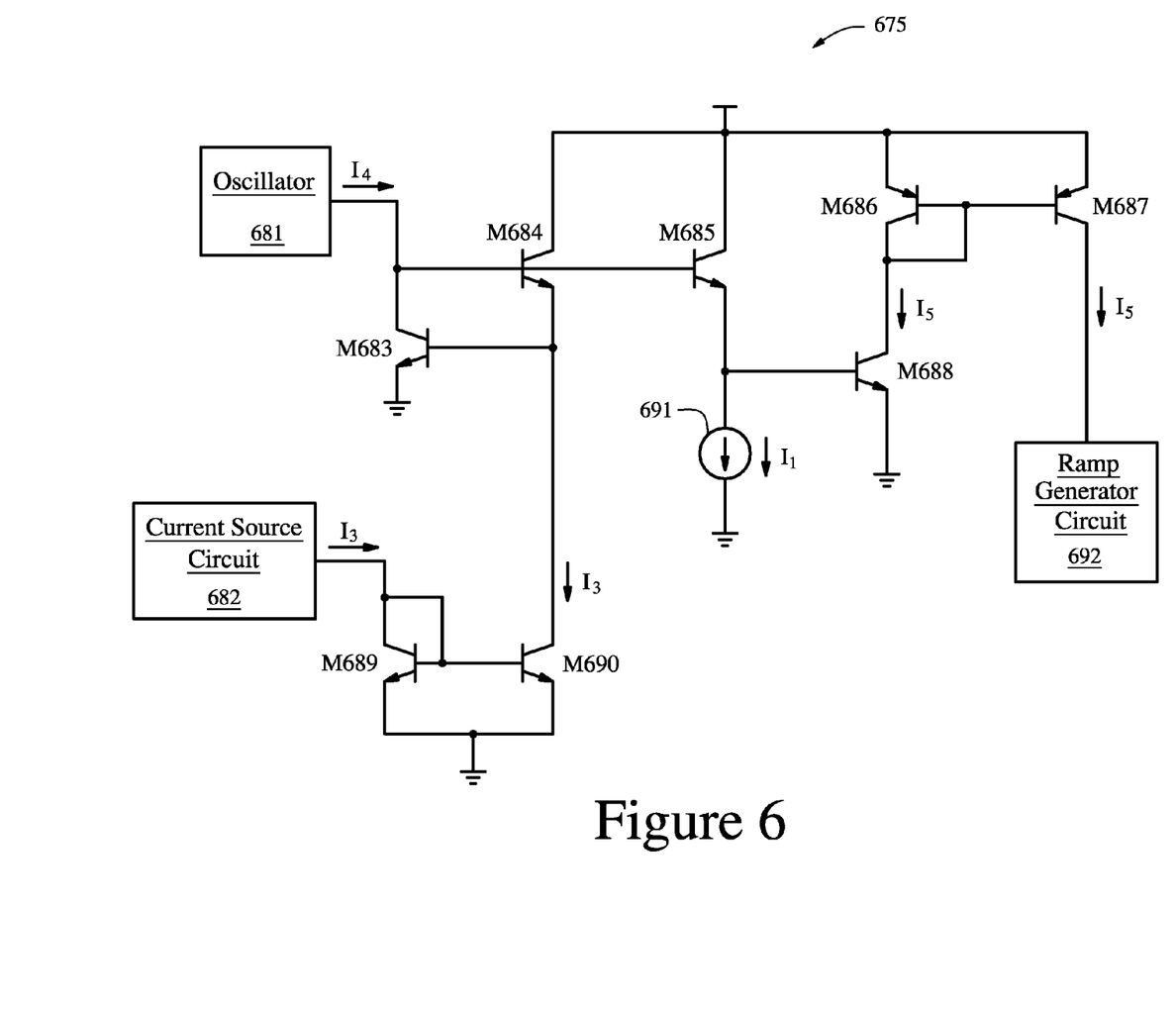
FIG. 6 schematically illustrates an embodiment of an analog current multiplier of the regulator circuit of FIG. 5 along with an oscillator, a current source circuit, and a ramp generator circuit.

FIG. 6 schematically illustrates an embodiment of analog current multiplier 675 along with oscillator 681, current source circuit 682, and ramp generator circuit 692. Analog current multiplier 675 is one embodiment current multiplier 575 of the regulator circuit of FIG. 5. Analog current multiplier 675 includes transistors M683–M690 and current source 691.

Transistors M689 and M690 are arranged to operate as a current mirror providing I3 from current source circuit 682 to an emitter terminal of M684. I3 may be expressed as I3=(Vin−Vou)/R, where R is 2 Mohm, as described in conjunction with FIG. 5 above. M684 and M685 are cascaded with their collector terminals coupled to a supply voltage and the base terminals driven by I4 provided by oscillator 681, where I4=fosc*K, where K is $6*10^{-12}$, as described above. Current source 691 is coupled to an emitter terminal of M685 and is arranged to provide I1 with a value of about 12 μA.

A collector terminal of transistor M688 is also coupled to the base-collector terminal of diode connected transistor M686 such that current I5 flows through a collector terminal of M688. I5 may expressed as I5=(I3*I4)/I1. A relationship between base-emitter voltages of transistors M683, M684, M685, and M688 may be expressed as:

$V_{BE(688)}=V_{BE(683)}+V_{BE(684)}-V_{BE(685)}$, where $V_{BE(683)}=V_T*ln(I4/Is)$, $V_{BE(684)}=V_T*ln(I3/Is)$, and $V_{BE(685)}=V_T*ln(I1/Is)$.

where Is is satulation current of bipolar transistor.

From the above base-emitter voltages, $V_{BE(688)}$ may be expressed as:

$V_{BE(688)}=V_T*ln(I3*I4)/(I1*Is)=Vt*ln(I5/Is)$. Assuming I1 is about 12 μA as mentioned previously, I5 may be expressed as $$I5 = I3 * \frac{I4}{12*10^{-6}}.$$

Transistors M686 and M687 are arranged to operate as a current mirror providing 15 to ramp generator circuit 692.

While analog current multiplier is shown employing BJT transistors and references to BJT technology are made throughout the specification and claims, other circuit technique such as Gilbert type analog multiplier may also be implemented without departing from the scope or spirit of the invention.

Each of the resistor circuits described may consist of a single resistor only, or may include a plurality of resistors that are coupled in series or in parallel, and the like. Similarly, each of the capacitor circuits describe may consist of a single capacitor only, or may include a plurality of capacitors that are coupled in series or in parallel, and the like. These and other embodiments are within the spirit and scope of the invention.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for switched buck regulation, comprising:
   an inductor circuit that is arranged to provide an inductor current;
   a capacitor circuit that is arranged to provide an output voltage from the inductor current;
   a bottom-side switch circuit that is coupled between a ground node and the inductor circuit, wherein the bottom-side switch is arranged to open and close responsive to a first switch control signal;
   a top-side switch circuit that is coupled between the inductor circuit and an input node, wherein the top-side switch circuit is configured to receive an input voltage at the input node; and wherein the top-side switch circuit is arranged to open and close responsive to a second switch control signal;
   a current sense amplifier circuit that is arranged to sense a current across the bottom-side switch circuit, and further arranged to provide a current sense voltage in response to the current;
   a sample-and-hold circuit that is arranged to sample the current sense voltage if the bottom-side switch is closed, and further arranged to hold the current sense voltage if the bottom-side switch is open, wherein the sample-and-hold circuit is arranged to provide a sample-and-hold signal;
   an analog current multiplier circuit that is arranged to provide control current;
   a ramp generator circuit that is arranged to provide a ramp voltage base in part on the control current and the sample-and-hold signal; and
   a switch control circuit that is configured to provide the first and second switch control signals based in part on the ramp voltage.

2. The circuit of claim 1, further comprising:
   an oscillator circuit that is arranged to provide an oscillator current; and
   a current source circuit that is arranged to receive the output voltage and a predetermined portion of the input voltage, and to provide a source current based in part on the output voltage and the predetermined portion of the input voltage.

3. The circuit of claim 2, wherein the analog current multiplier is further arranged to determine the control current based in part on the oscillator current and the source current.

4. The circuit of claim 2, wherein the oscillator circuit is further arranged to provide a frequency fosc, and wherein the oscillator current is determined based on fosc such that the oscillator current is about equal to $fosc*6*10^{-12}$.

5. The circuit of claim 2, wherein the current source circuit is arranged to provide the source current based on the output voltage, Vout, and the predetermined portion of the input voltage, Vin, such that the source current is about equal to $$\frac{Vin - Vout}{2*10^6}.$$

6. The circuit of claim 3, wherein the analog current multiplier is further arranged to provide the control current based on the source current and the oscillator current such that the control current is about equal to $$I3 * \frac{I4}{12 * 10^{-6}}.$$

7. The circuit of claim 3, wherein the analog current multiplier includes:
   a first current mirror circuit that is arranged to provide the source current from the current source circuit;
   a current source that is arranged to provide a first current with a value of about 12 µA;
   a pair of transistors that are coupled in parallel to each other such, and are arranged to combine the source current, the oscillator current, and the first current, and to provide the control current such that the control current is about equal to a product of the source current and the oscillator current divided by 12 µA; and
   a second current mirror circuit that is arranged to provide the control current to the ramp generator circuit.

8. The circuit of claim 1, wherein the top-side switch circuit includes a transistor, and wherein the bottom-side switch circuit includes another transistor.

9. The circuit of claim 1, wherein the sample-and-hold circuit includes a switched capacitor.

10. A circuit for switched buck regulation, comprising:
    an inductor circuit that is coupled between a switch node and an output node;
    a capacitor circuit that is coupled to the output node;
    a bottom-side switch circuit that is coupled between a ground node and the switch node;
    a top-side switch circuit that is coupled between switch node and an input node;
    a current sense amplifier circuit including a first input that is coupled to the switch node, and further including a second input that is coupled to the ground node;
    a sample-and-hold circuit including an input that is coupled to an output of the current sense amplifier circuit;
    an oscillator circuit;
    a current source circuit including a first input that is coupled to the output node and a second input that is coupled to a resistor, wherein the resistor is coupled to the input node;
    an analog current multiplier circuit including a first input that is coupled to an output of the oscillator and a second input that is coupled to an output of the current source circuit;
    a ramp generator circuit including a first input that is coupled to an output of the analog current multiplier circuit and a second input that is coupled to an output of the sample-and-hold circuit; and
    a switch control circuit including an input that is coupled to an output of the ramp generator circuit.

11. A method for providing switched buck regulation, comprising:
    providing a ramping current;
    providing an output voltage from the ramping current;
    coupling a ground node to the means for providing the ramping current if a first switch control signal is asserted;
    coupling an input node to the means for providing the ramping current if a second switch control signal is asserted;
    sensing a current across the means for coupling the ground node to the means for providing the ramping current;
    providing a current sense voltage in response to the current;
    sampling the current sense voltage if the means for providing the ramping current is coupled to the ground node;
    holding the current sense voltage if the means for providing the ramping current is coupled to the input node;
    providing an oscillator current;
    providing a source current based in part on a difference between the output voltage and a predetermined portion of the input voltage;
    providing a control current based in part on the source current and the oscillator current;
    providing a ramp voltage based in part on the control current and sampled-and-held current sense voltage; and
    providing the first and the second switch control signals based on the ramp voltage.

* * * * *

UNITED STATES PATENT AND TRADEMARK OFFICE
CERTIFICATE OF CORRECTION

PATENT NO. : 7,119,522 B2
APPLICATION NO. : 11/002544
DATED : October 10, 2006
INVENTOR(S) : Kenji Tomiyoshi It is certified that error appears in the above-identified patent and that said Letters Patent is hereby corrected as shown below:

In the Specification:

Sheet 1 of 6 (Figure 1), Line 1, Delete "VIN" and insert -- Vin --.

Sheet 1 of 6 (Figure 1), Line 3 (Approx.), After "I1" delete "VOUT" and insert --Vout --.

Sheet 2 of 6 (Figure 2), Line 1, Delete "VIN" and insert -- Vin --.

Sheet 2 of 6 (Figure 2), Line 4 (Approx.), After "I1" delete "VOUT" and insert -- Vout--.

Sheet 4 of 6 (Figure 4), Line 2 (Approx.), Delete "$\frac{V_{in}(-V_{out})}{R0}$" and insert -- $\frac{V_{in}-V_{out}}{R0}$ --.

Column 2, Line 61, After "provide current" delete "12," and insert -- I2, --.

Column 2, Line 61, Before "is" delete "12" and insert -- I2 --.

Column 2, Line 63, Delete "13" and insert -- I3 --.

Column 2, Line 64, Delete "12." and insert -- I2. --.

Column 2, Line 66, Delete "13" and insert-- I3 --.

Column 4, Line 25, Delete "11." and insert -- I1. --.

Column 4, Line 48, Delete "15" and insert -- I5 --.

Column 4, Line 53, Delete "12 uA" and insert -- 12 $\mu$A --.

Column 4, Line 56, Delete "13" and insert -- I3 --.

UNITED STATES PATENT AND TRADEMARK OFFICE
CERTIFICATE OF CORRECTION

PATENT NO. : 7,119,522 B2
APPLICATION NO. : 11/002544
DATED : October 10, 2006
INVENTOR(S) : Kenji Tomiyoshi It is certified that error appears in the above-identified patent and that said Letters Patent is hereby corrected as shown below:

Column 5, Line 14 (Approx.), Delete "I3=(Vin-Vou)/R," and insert
-- I3=(Vin-Vout)/R, --.

Column 5, Line 46, Delete "15" and insert -- I5 --.

Column 6, Line 14, In Claim 1, delete "node;" and insert -- node, --.

Signed and Sealed this

Twenty-fourth Day of April, 2007

JON W. DUDAS
*Director of the United States Patent and Trademark Office*